United States Patent [19]

Shapiro

[11] Patent Number: 5,606,436
[45] Date of Patent: Feb. 25, 1997

[54] LIQUID CRYSTAL PROJECTION PANEL CONSTRUCTION AND METHOD OF MAKING SAME

[75] Inventor: Leonid Shapiro, Lakeside, Calif.

[73] Assignee: Proxima Corporation, San Diego, Calif.

[21] Appl. No.: 345,601

[22] Filed: Nov. 28, 1994

Related U.S. Application Data

[63] Continuation-in-part of Ser. No. 342,920, Nov. 21, 1994, abandoned.

[51] Int. Cl.$^6$ .................. G02F 1/1335; G02F 1/1333
[52] U.S. Cl. .................. 349/59; 349/5; 349/110
[58] Field of Search .................. 359/40, 41, 67

[56] References Cited

U.S. PATENT DOCUMENTS

| | | | |
|---|---|---|---|
| 4,508,428 | 4/1985 | Harada | 359/67 |
| 4,971,436 | 11/1990 | Aoki et al. | 353/31 |
| 5,052,783 | 10/1991 | Hamada | 359/40 |
| 5,102,217 | 4/1992 | Takafuji et al. | 353/84 |
| 5,126,863 | 6/1992 | Otsuka et al. | 359/41 |
| 5,187,599 | 2/1993 | Nakanishi et al. | 359/41 |
| 5,276,538 | 1/1994 | Monji et al. | 359/40 |
| 5,300,942 | 4/1994 | Dolgoff | 345/32 |
| 5,315,418 | 5/1994 | Sprague et al. | 359/41 |
| 5,353,133 | 10/1994 | Bernkopf | 359/41 |
| 5,381,187 | 1/1995 | Takamatsu et al. | 348/759 |
| 5,473,354 | 12/1995 | Kurematsu | 359/67 |
| 5,473,453 | 12/1995 | Kurematsu | 359/67 |
| 5,508,834 | 4/1996 | Yamada et al. | 359/41 |

FOREIGN PATENT DOCUMENTS

| | | |
|---|---|---|
| 0534426 | 3/1993 | European Pat. Off. . |
| 0593265 | 4/1994 | European Pat. Off. . |
| 0593266 | 4/1994 | European Pat. Off. . |
| 0600728 | 6/1994 | European Pat. Off. . |
| 0601628 | 6/1994 | European Pat. Off. . |
| 0605232 | 7/1994 | European Pat. Off. . |
| 2115889 | 4/1990 | Japan . |
| 3136004 | 6/1991 | Japan . |
| 4-50802 | 2/1992 | Japan ............... 359/40 |
| 545642 | 2/1993 | Japan . |
| 460538 | 2/1994 | Japan . |

OTHER PUBLICATIONS

Thomas V. Higgins, "Reflections on Surfaces, Coatings, and Thin Films," Laser Focus World, p. 61 (Sep. 1994).
T. Takamatsu, et al., "Single Panel LC Projector with a Planar Microlens Array," Japan Display '92 Porceedings, p. 875 (no month) (1992).

Primary Examiner—William L. Sikes
Assistant Examiner—Charles Miller
Attorney, Agent, or Firm—Bernard L. Kleinke; Peter P. Scott

[57] ABSTRACT

A liquid crystal projection panel construction and a method of making it includes securing an interference color filter member and a lenticular lenslet array plate to a high resolution display panel to produce a bright, full color high resolution image. The panel construction is small in size, and relatively inexpensive to manufacture.

24 Claims, 3 Drawing Sheets

LIQUID CRYSTAL PROJECTION PANEL CONSTRUCTION AND METHOD OF MAKING SAME

CROSS REFERENCE TO RELATED APPLICATIONS

This application is a continuation-in-part of U.S. patent application Ser. No. 08/342,920, filed on Nov. 21, 1994, entitled "LIQUID CRYSTAL PROJECTION PANEL CONSTRUCTION AND METHOD OF MAKING SAME", now abandoned.

TECHNICAL FIELD

The present invention relates in general to an improved high resolution full color single liquid crystal projection panel construction, and a method of making it. The invention more particularly relates to a liquid crystal projection panel construction which enables an image to be projected in bright full color, and which is constructed according to a novel method to be small in size and relatively inexpensive to manufacture.

BACKGROUND ART

There have been many types and kinds of projection systems for projecting bright full color images onto a remote viewing surface. One such system utilizes three liquid crystal display panels to generate red, green, and blue monochromatic images. Each liquid crystal display has an associated color dye or pigment filter to produce each of the monochromatic images.

While such a system provides an adequate full color image, the system is relatively large in size. Thus, a bulky housing must be employed to accommodate the three liquid crystal displays so constructed and arranged for combining the monochromatic images. Furthermore, such a system is relatively expensive to manufacture, since three liquid crystal displays are employed. Thus, it is desirable to have a full color panel construction which is extremely compact in size and relatively inexpensive to manufacture, at the same time, such a panel construction should be capable of projecting bright full color images.

To reduce the size and expense of a full color projection panel construction, systems have been devised which utilize a single active matrix liquid crystal display (AMLCD). The AMLCD is comprised of a large number of monochromatic sub-pixels arranged in a triad or stripe arrangement, wherein each triad or group of three stripes forms a single full color pixel element. To produce the monochromatic sub-pixels, color dye or pigment filters are attached or deposited on the AMLCD to absorb unwanted wavelengths of light. One dye or pigment filter for each sub-pixel is required to achieve the triad or stripe full color pixel.

Although such a single panel construction has been successful in producing full color projected images, the size and efficiency of the AMLCD panel has been constricted by the physical limitations of the dye or pigment filters. In this regard, the dye or pigment filter functions by absorbing unwanted wavelengths of light and permitting a desired wavelength to pass therethrough. To accomplish this, the filters must have certain physical attributes, such as the proper thickness to absorb completely the unwanted wavelengths of light. Thus, the thickness of the filter limits the acceptable thickness of the combination of the AMLCD and the filter.

In addition to the size limitations of the dye or pigment filter, the inefficiency of the filter also detracts from its overall suitability. The absorption of unwanted wavelengths of light generates heat within the dye or pigment filter, adversely affecting its ability to absorb light. Such heat can be transmitted to the AMLCD, thereby affecting adversely the proper operation of the AMLCD which contains a heat sensitive liquid crystal material. Furthermore, dye or pigment filters are relatively hard to etch or deposit on glass during fabrication.

Therefore, it would be highly desirable to have a new and improved projection panel construction, which is relatively small in size, and yet highly efficient to produce bright full color images. Such a construction should be relatively inexpensive to manufacture.

In addition to the foregoing desirable characteristics, it would be further desirable to have such a panel construction, which can produce a high resolution image, and which at the same time can be relatively small in size.

A problem in reducing the overall size of such a panel construction has been the reduction of the pixel element aperture ratio. The aperture ratio refers to the actual area of the thin film transistor layer deposited on the AMLCD which activates the liquid crystal to modulate light passing therethrough relative to the area which does not activate the liquid crystal. The area of the thin film transistor layer which does not activate the liquid crystal is comprised of electrical circuit elements to transmit signals to the area which does activate the liquid crystal. As pixel density increases, which occurs when the size of the AMLCD is reduced, the activating area is reduced substantially in proportion to the non-activating area, thus the decrease in aperture ratio.

The reduction of the aperture ratio results in a reduction of the transmissivity of the AMLCD panel. Lower transmissivity detrimentally affects the brightness of the projected full color image. Also, cross talk can occur between the pixel elements. Thus, the image can appear to be degraded in quality.

Therefore, it would be highly desirable to have a new and improved panel construction, which is extremely compact in size, having a high density of pixel elements to produce a high resolution image. Also, such a projected image should be a bright full color image. Additionally, such a panel construction should be relatively inexpensive to manufacture.

DISCLOSURE OF INVENTION

Therefore, the principal object of the present invention is to provide a new and improved liquid crystal display projection panel construction, and a method of making it, wherein the panel construction is relatively small in size and is relatively inexpensive to manufacture.

Another object of the present invention is to provide such a new and improved panel construction which has a relatively high density of pixel elements to produce a high resolution image, and which projects a bright full color image.

Briefly, the above and further objects of the present invention are realized by providing a new and improved liquid crystal display projector panel construction which can be manufactured according to a novel method of the present invention.

A liquid crystal projection panel construction includes a high resolution liquid crystal display panel for generating an image, and a color interference filter member secured to the panel for supplying light of selected wavelengths to panel pixel elements to facilitate the generation of a full color projected image. A microlens array plate is secured to the interference filter member to converge the incoming light through the filter layer and the pixels for utilizing substantially all of said incoming light to project the full color image, thereby increasing the brightness of the full color image.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein.

BEST MODE FOR CARRYING OUT THE INVENTION

Figure 1:
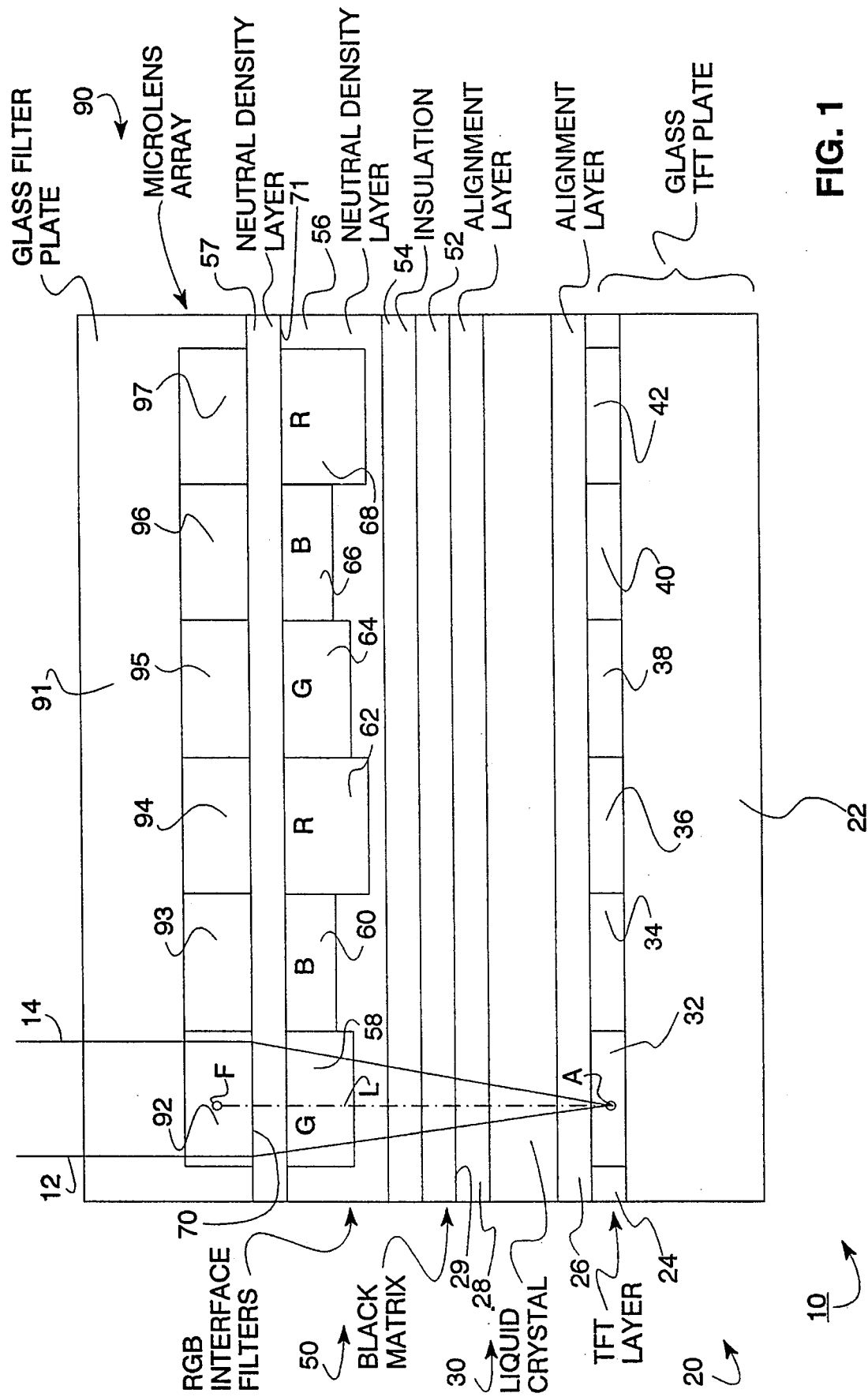
FIG. 1 is a schematic cross-sectional diagrammatic view of a liquid crystal display projection panel construction, which is constructed in accordance with the present invention.

Referring now to the drawings, more particularly FIG. 1 thereof, there is shown a liquid crystal display projection panel construction 10, which is constructed in accordance to the present invention.

The projection panel construction 10 generally comprises an active matrix liquid crystal display (AMLCD) panel 20, having an incident light surface 29, for modulating light to facilitate the projection of an image. The AMLCD panel 20 includes a plurality of pixel elements 32, 34, 36, 38, 40, and 42 to separate the modulated light into several controllable elements. A filter arrangement 50 is secured to the incident light surface 29 in an overlying relationship and includes a plurality of individual interference filters 58, 60, 62, 64, 66, and 68 aligned in registration with corresponding pixel elements 32, 34, 36, 38, 40, and 42, respectively, to selectively pass light therethrough. A lenticular lenslet, or microlens, array panel 90 is secured to a planar surface 70 of the filter arrangement 50 in an overlying relationship with the interference filter arrangement 50, and includes individual lenslets 92, 93, 94, 95, 96, and 97 disposed in registration with corresponding filters 58, 60, 62, 64, 66, and 68, and corresponding pixel elements 32, 34, 36, 38, 40, and 42, respectively.

In use, incident light rays 12 and 14 impinge onto the lenticular lenslet array panel 90 and pass through the lenslets, such as the lenslet 92. The lenslet 92 causes the incident light to converge to an aperture A within the aligned corresponding pixel element 32. The converging light passes through the interference filter 58. The interference filter 58 permits light having a wavelength corresponding to the color green to pass therethrough, while reflecting or dispersing all other wavelengths of light. In this way, only converging green light is permitted to reach the aperture A of the pixel element 32.

The pixel element 32 is then electronically controlled to modulate the green light passing therethrough. In this way, a green pixel image is formed. Pixel elements 34, 36, 38, 40, and 42 operate in a similar manner to generate blue and red pixel images, as well as red pixel images, to form a full color image.

Considering now the construction of the AMLCD panel 20 in greater detail, the panel 20 includes a glass substrate 22, which could include a quartz glass substrate, having a thin layer of amorphous silicon or polysilicon material to form a drive circuit or TFT layer 24 which is deposited on the substrate 22. The TFT devices (not shown) are formed in the amorphous silicon or polysilicon layers by methods known in the art.

The TFT layer 24 includes the pixel elements 32, 34, 36, 38, 40, and 42 which are controlled by corresponding drive circuitry in the TFT layer 24. It will be understood by one skilled in the art that the pixel elements 32, 34, 36, 38, 40, and 42 as shown in FIG. 1, are illustrated in a diagrammatic representational form only, and that spaces between the elements may exist.

The AMLCD panel 20 provides relatively high resolution capability for a given size. In this regard, the numbers of pixels in a single dimension is increased threefold to provide three times the number of pixels. For example, a 640×480 panel is expanded to a 1920×480 panel. However, the increased number of pixels is accomplished within the same surface area previously occupied by one third as many pixels.

The increase of pixels within an area that remains constant results in a higher density of pixels. The physical properties of the amorphous silicon or polysilicon layer enables the pixel density to be increased without a substantial detrimental effect to the aperture ratio while enabling the electrical circuitry corresponding to the increased number of pixels to be accommodated on the panel 20.

The panel 20 further includes a liquid crystal arrangement 30 secured to the panel TFT layer 24 for cooperating with the TFT layer 24 to modulate light. The liquid crystal arrangement 30 includes a liquid crystal material sandwiched or disposed between a pair of alignment layers 26 and 28, wherein the liquid crystal material modulates the light passing therethrough.

Considering now the filter arrangement 50 in greater detail, the filter arrangement 50 includes a black matrix 52 for controlling the light passing therethrough for facilitating the reduction of optical cross talk. The black matrix 52 is secured to the incident light surface 29 of the panel 20. While the location of the black matrix 52 is described and shown as being secured to the surface 29, the black matrix 52 may also be located elsewhere within the optical path, such as on the TFT layer 24.

An insulation layer 54 is secured to the black matrix 52 and separates the interference filters 58, 60, 62, 64, 66, and 68 from the black matrix 52 to substantially reduce the amount of heat which reaches the panel 20. The interference filters 58, 60, 62, 64, 66, and 68 are each aligned optically with the respective pixel elements 32, 34, 36, 38, 40, and 42 for permitting the desired wavelengths of light to pass through while blocking undesired wavelengths of light. The thickness of each interference filter 58, 60, 62, 64, 66, and 68 is dependent upon the particular wavelength of light which is permitted to pass therethrough. Thus, the filter thicknesses vary, depending upon whether red, green or blue light is permitted to pass through the filters 58, 60, 62, 64, 66, and 68. By using multilayer, or all-dielectric, interference filters, undesired wavelengths of light are reflected or dispersed without creating additional heat and simultaneously permitting the maximum amount of desired light wavelengths to pass through. The interference filters 58, 60, 62, 64, 66, and 68 eliminate unwanted wavelengths of light by destructive interference.

A neutral density layer 56 surrounds the interference filters 58, 60, 62, 64, 66, and 68 to space them apart from the insulation layer 54. As a result of the different thicknesses of the interference filters 58, 60, 62, 64, 66, and 68, the neutral density layer 56 has a varying thickness to compensate for the different thicknesses of the respective interference filters. It will be understood by one skilled in the art that the thickness of the neutral density layer 56 can be reduced or even eliminated, depending upon the focal length of the lenslets as described hereinafter. In this regard, the thickness of the neutral density layer 56 and the focal lengths of the lenslets are interdependent. Adjusting one requires adjusting the other to maintain the correct convergence of light. As a result, the thickness of the neutral density layer 56 can be adjusted to accommodate the focal lengths of the lenslets.

The filter arrangement 50 further includes another neutral density layer 57 interposed between the filters 58, 60, 62, 64, 66 and 68, and the lenticular lenslet array 90 to space apart the filters 58, 60, 62, 64, 66 and 68 from the lenslet array 90 to accommodate the focal lengths of the lenslets 92, 93, 94, 95, 96 and 97. Neutral density layer 57 includes a deposition surface 71. The layer 57 is approximately 100 microns to 200 microns thick to be adjustable in its thickness to accommodate the individual focal length optic paths of the array 90, and has a substantially uniform thickness throughout. The filters 58, 60, 62, 64, 66 and 68 are formed on and secured to the deposition surface 71 by methods known in the art, such as by a suitable deposition process.

Considering now the lenticular lenslet array 90 in greater detail, the lenslet array 90 includes a glass plate 91, which could include a quartz glass plate, having individual lenslets 92, 93, 94, 95, 96, and 97 disposed therein. The individual lenslets 92, 93, 94, 59, 96, and 97 are fabricated by diffusion or ion exchange on the inner surface of the glass plate 91, and are aligned in registration with the respective interference filters 58, 60, 62, 64, 66, and 68, and the respective pixel elements 32, 34, 36, 38, 40, and 42.

Other methods for fabricating the lenslets 92, 93, 94, 95, 96, and 97 are also contemplated. For example, the lenslets 92, 93, 94, 95, 96, and 97 could be fabricated from molded plastic or another similar fabrication method. Diffractive optics could also be used. The tolerances on the fabrication of the lenslet array 90 must be relatively tight to minimize optical scattering at lenslet boundaries and other anomalies. Furthermore, the alignment of the lenslet array 90 is critical, and should be controlled to be within about 5% of the pixel pitch P, or better. Although the lenticular lenslet array 90 is described and shown secured to the filter arrangement 50, the lenslet array 90 could be located in other positions within the optical path.

Considering now the construction of the lenslets 92, 93, 94, 95, 96, and 97, only lenslet 92 will be considered in greater detail hereinafter as each of the lenslets are substantially similar. Lenslet 92 is preferably rectangular and configured to permit its profile or footprint to be about equal to the lines along the centers of the pixel boundaries. While lenslet 92 is preferably rectangular, other shapes may also be accommodated. The focal length of the lenslet 92 is fabricated to be substantially equal to the length L between the point F on the planar surface 70 to the aperture A. In this way, the incident light rays 12 and 14 converge at about the central portion of the pixel element 32 corresponding to the aperture A. The lenslet 92 may be immersed in a refractive index greater than unity, for example 1.5, and the length L should be appropriate to focus the light at the aperture A. Due to the immersion, the "in air" focal length of lenslet 92 is reduced by about 33%.

Figure 2:
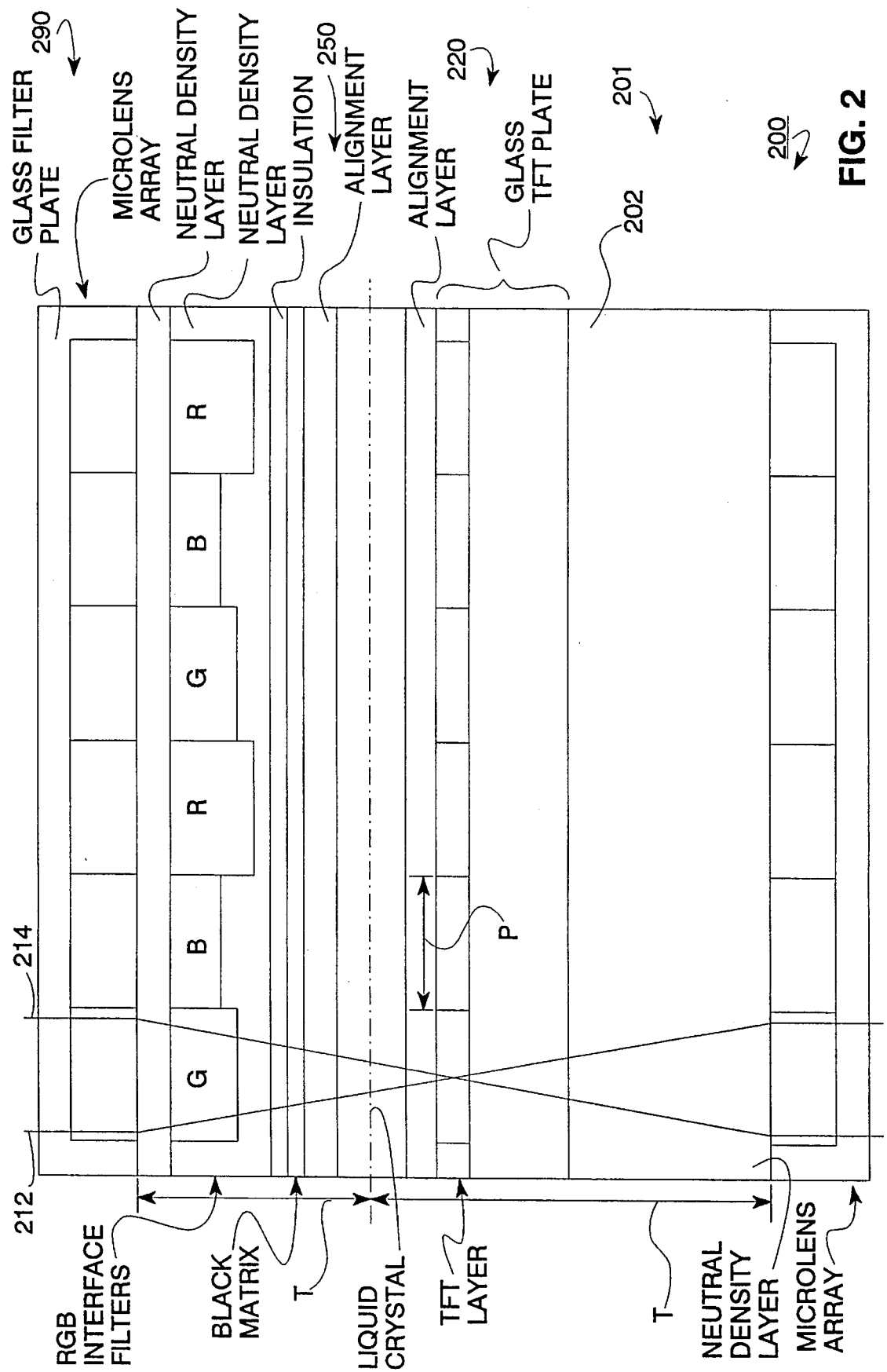
FIG. 2 is a schematic cross-sectional diagrammatic view of another liquid crystal display projection panel, which is also constructed in accordance with the present invention.

Referring now to FIG. 2 there is shown another high resolution panel 200. The higher resolution panel 200 includes and AMLCD panel 220, a filter arrangement 250 and a lenticular lens array 290, which are substantially similar to the AMLCD panel 20, the filter arrangement 50, and the lenticular lenslet array 90 respectively, of FIG. 1, and will not be discussed in greater detail hereinafter. The high resolution panel 200 further includes another neutral density layer 202 which is substantially similar to the neutral density layer 56. Another lenticular lenslet array 201, which is substantially similar to the lenticular lenslet array 290, is secured in an underlying relationship to the AMLCD panel 220, and is aligned in registration with the corresponding lenticular lenslet array 290. The lenslet array 201 intercepts the diverging light rays which have passed through the pixel elements to collimate them for enabling the projection of pixels with relatively little or no optical cross talk.

Lenticular lenslet arrays 290 and 201 each have an effective focal length of thickness T. The alignment of lenslet arrays 290 and 291 should be controlled to be within about 5% of the pixel pitch P, or better.

Figure 3:
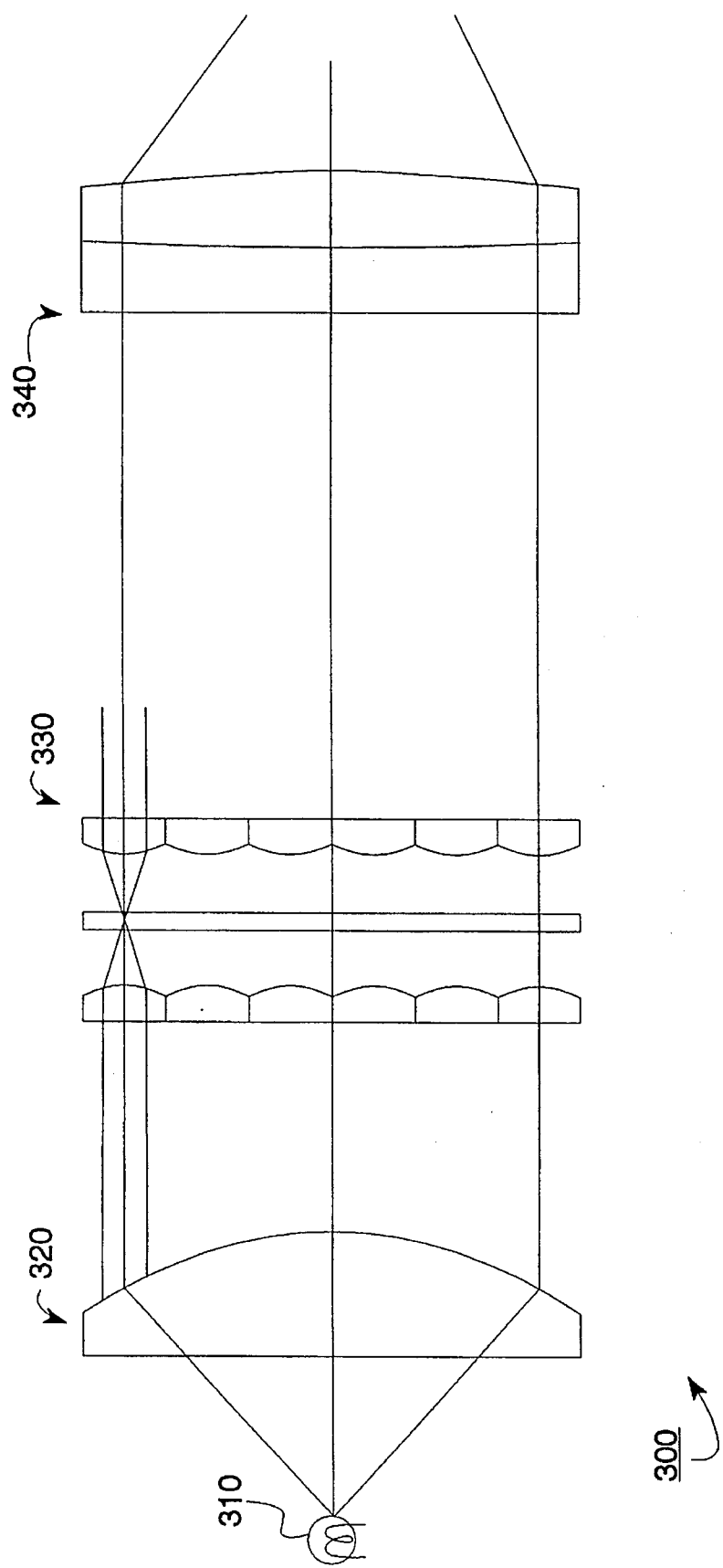
FIG. 3 is a schematic diagrammatic view of a liquid crystal display projection system, which is constructed in accordance with the present invention.

Referring now to FIG. 3, there is shown a liquid crystal display projection system 300 which is constructed in accordance with the present invention. The projection system 300 includes a light source 310, a collimating optical lens 320 to collimate light from the light source 310, a high resolution panel 330 which is substantially similar to the high resolution panel 200 (FIG. 2) to modulate the collimated light for generating an image to be projected, and a telocentric projection lens 340 to project the image onto a remote surface (not shown).

In operation, the light source 310 generates non-collimated light. The non-collimated light impinges on the collimating optical lens 320 wherein the light exits the lens 320 as collimated light. The collimated light passes through the high resolution panel 330 substantially free from cross talk interference, wherein the light is modulated to generate a bright image. The modulated light exits the panel 330 as substantially collimated light and then passes through the telocentric projection lens 340 for projecting the resulting bright image on to the remote surface.

Although the foregoing describes the use of a polysilicon active matrix liquid crystal display in the inventive high resolution projection panel, other active matrix liquid crystal displays may also be used to obtain satisfactory results. For example, a single crystal silicon transferring panel as manufactured by Kopin of Taunton, Mass. will also work, as will a silicon on sapphire active matrix liquid crystal display.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A liquid crystal projection panel construction, comprising:

a high resolution liquid crystal display panel means having a plurality of closely spaced apart pixel elements to modulate light passing therethrough for producing an image in response to electrical signals;

an interference filter member being secured in overlying relationship with said panel means and having a plurality of individual colored filter elements disposed in registration with corresponding ones of said pixel elements for passing selectively certain wavelengths of light only to individual ones of said pixel elements;

a lenticular lenslet array panel in overlying relationship relative to said filter member and having a plurality of lenslets disposed in registration with corresponding ones of said pixel and filter elements for focusing said light toward the aperture of each pixel element to enable substantially all of the light to pass therethrough;

whereby bright colored images are formed for projection purposes; and a black matrix layer interposed between said filter member and said panel means.

2. A liquid crystal projection panel construction according to claim 1, further including a polysilicon substrate means for helping to control electrically said pixel elements to facilitate the modulation of light passing through said liquid crystal display panel means.

3. A liquid crystal projection panel construction according to claim 1, further including a single crystal silicon transferring substrate means for helping to control electrically said pixel elements to facilitate the modulation of light passing through said liquid crystal display panel means.

4. A liquid crystal projection panel construction according to claim 1, further including a silicon on sapphire substrate means for helping to control electrically said pixel elements to facilitate the modulation of light passing through said liquid crystal display panel means.

5. A liquid crystal display projector according to claim 1, further including a light source means for illuminating said panel construction to form an image thereby, and projection lens means for projecting the image from said panel construction for viewing remotely the projected image.

6. A liquid crystal projection panel construction according to claim 1, wherein each of said lenslets has an individual focal length substantially equal to the distance between the aperture and the lenslet.

7. A liquid crystal projection panel construction according to claim 1, wherein said filter member includes red, blue, and green filter elements.

8. A liquid crystal projection panel construction according to claim 1, wherein each one of said filter elements each has a different thickness associated therewith.

9. A liquid crystal projection panel construction according to claim 1, further including an output lenticular lens array means secured in overlying relationship to the display panel means and bearing a plurality of output lenslets corresponding to, and in registration with, the first-mentioned plurality of lenslets for focusing light emerging therefrom to help prevent cross talk between said pixels.

10. A liquid crystal projection panel construction according to claim 9, further including a neutral density layer means interposed between said output lenticular lens array means and said display panel means, said layer means having a thickness to accommodate the focal lengths of said output lenslets relative to the apertures of the pixels.

11. A liquid crystal projection panel construction according to claim 1, further including a neutral density layer interposed between said lenslets and said display panel means, said layer having a thickness to accommodate the focal lengths of the individual ones of said lenslets relative to the apertures of the respective ones of the pixels.

12. A liquid crystal projection panel construction according to claim 1, further including an insulation layer interposed between said filter member and said display panel means.

13. A liquid crystal projection panel construction, comprising:

a high resolution liquid crystal display panel means having a plurality of closely spaced apart pixel elements to modulate light passing therethrough for producing an image in response to electrical signals;

an interference filter member being secured in overlying relationship with said panel means and having a plurality of individual colored filter elements disposed in registration with corresponding ones of said pixel elements for passing selectively certain wavelengths of light only to individual ones of said pixel elements;

a lenticular lenslet array panel in overlying relationship relative to said filter member and having a plurality of lenslets disposed in registration with corresponding ones of said pixel and filter elements for focusing said light toward the aperture of each pixel element to enable substantially all of the light to pass therethrough;

whereby bright colored images are formed for projection purposes;

a neutral density layer interposed between said filter member and said panel means, said layer having a thickness to accommodate the focal lengths of the individual ones of said lenslets relative to the apertures of the respective ones of the pixel elements; and another neutral density layer, said another neutral density layer being interposed between said lenslet array panel and said filter member to space them apart.

14. A liquid crystal projection panel construction according to claim 13, wherein said filter member is secured to said another neutral density layer.

15. A liquid crystal projection panel construction according to claim 14, wherein said another neutral density layer is between about 100 microns and 200 microns in thickness.

16. A method of making a liquid crystal projection panel, comprising:

using a high resolution liquid crystal display panel means having a plurality of closely spaced apart pixel elements to modulate light passing therethrough for producing an image in response to electrical signals;

securing an interference filter member in overlying relationships with said panel means and having a plurality of individual colored filter elements disposed in registration with corresponding ones of said pixel elements for passing selectively the transmission of said light to facilitate projecting said image in full color;

disposing a lenticular lenslet panel in overlying relationship relative to said filter member and having a plurality of lenslets disposed in registration with corresponding ones of said pixel and filter elements for focusing said light toward the aperture of each pixel element to enable substantially all of the light to pass therethrough;

whereby bright colored images are formed for projection purposes; and interposing a black matrix layer between said filter member and said panel means.

17. A method of making a liquid crystal projection panel according to claim 16, further including adjusting the individual focal lengths of each one of said lenslets to have an individual focal length substantially equal to the distance between the aperture of its corresponding pixel and the lenslet.

18. A method of making a liquid crystal projection panel according to claim 16, further including constructing each one of said filter elements to have different thicknesses associated therewith.

19. A method of making a liquid crystal projection panel according to claim 16, further including using an output substrate means having an output lenticular lens array means having a plurality of output lenslets in overlying relationship to the display panel means, and focusing light emerging from said display panel means to help prevent cross talk between said pixel elements.

20. A method of making a liquid crystal projection panel according to claim 19, further including interposing a neutral density layer means between said output lenticular lens array means and said display panel means, said layer means having a thickness to accommodate the individual focal lengths of said output lenslets relative to the apertures of the pixels.

21. A method of making a liquid crystal projection panel according to claim 16, further including interposing a neutral density layer between said filter member and said display panel means, said layer having a thickness to accommodate the focal lengths of the individual ones of said lenslets relative to the apertures of the respective ones of the pixels.

22. A method of making a liquid crystal projection panel according to claim 16, further including interposing an insulation layer between said filter member and said display panel means.

23. A liquid crystal projection panel construction produced in accordance with the method of claim 16.

24. A method of making a liquid crystal projection panel, comprising:

using a high resolution liquid crystal display panel means having a plurality of closely spaced apart pixel elements to modulate light passing therethrough for producing an image in response to electrical signals;

securing an interference filter member in overlying relationships with said panel means and having a plurality of individual colored filter elements disposed in registration with corresponding ones of said pixel elements for passing selectively the transmission of said light to facilitate projecting said image in full color;

disposing a lenticular lenslet panel in overlying relationship relative to said filter member and having a plurality of lenslets disposed in registration with corresponding ones of said pixel and filter elements for focusing said light toward the aperture of each pixel element to enable substantially all of the light to pass therethrough;

whereby bright colored images are formed for projection purposes;

interposing a neutral density layer between said filter member and said panel means, said layer having a thickness to accommodate the focal lengths of the individual ones of said lenslets relative to the apertures of the respective ones of the pixel elements; and interposing another neutral density layer between said filter member and said lenslet panel to space them apart.

* * * * *

UNITED STATES PATENT AND TRADEMARK OFFICE
CERTIFICATE OF CORRECTION

PATENT NO. : 5,606,436
DATED : February 25, 1997
INVENTOR(S) : Leonid Shapiro

It is certified that error appears in the above-indentified patent and that said Letters Patent is hereby corrected as shown below:

Title page, item [56], delete "5,473,354"

Signed and Sealed this

Twenty-ninth Day of July, 1997

Attest:

BRUCE LEHMAN

Attesting Officer

Commissioner of Patents and Trademarks